July 7, 1953  F. S. FLICK  2,644,701
PISTON ROD SEAL
Filed Nov. 10, 1948
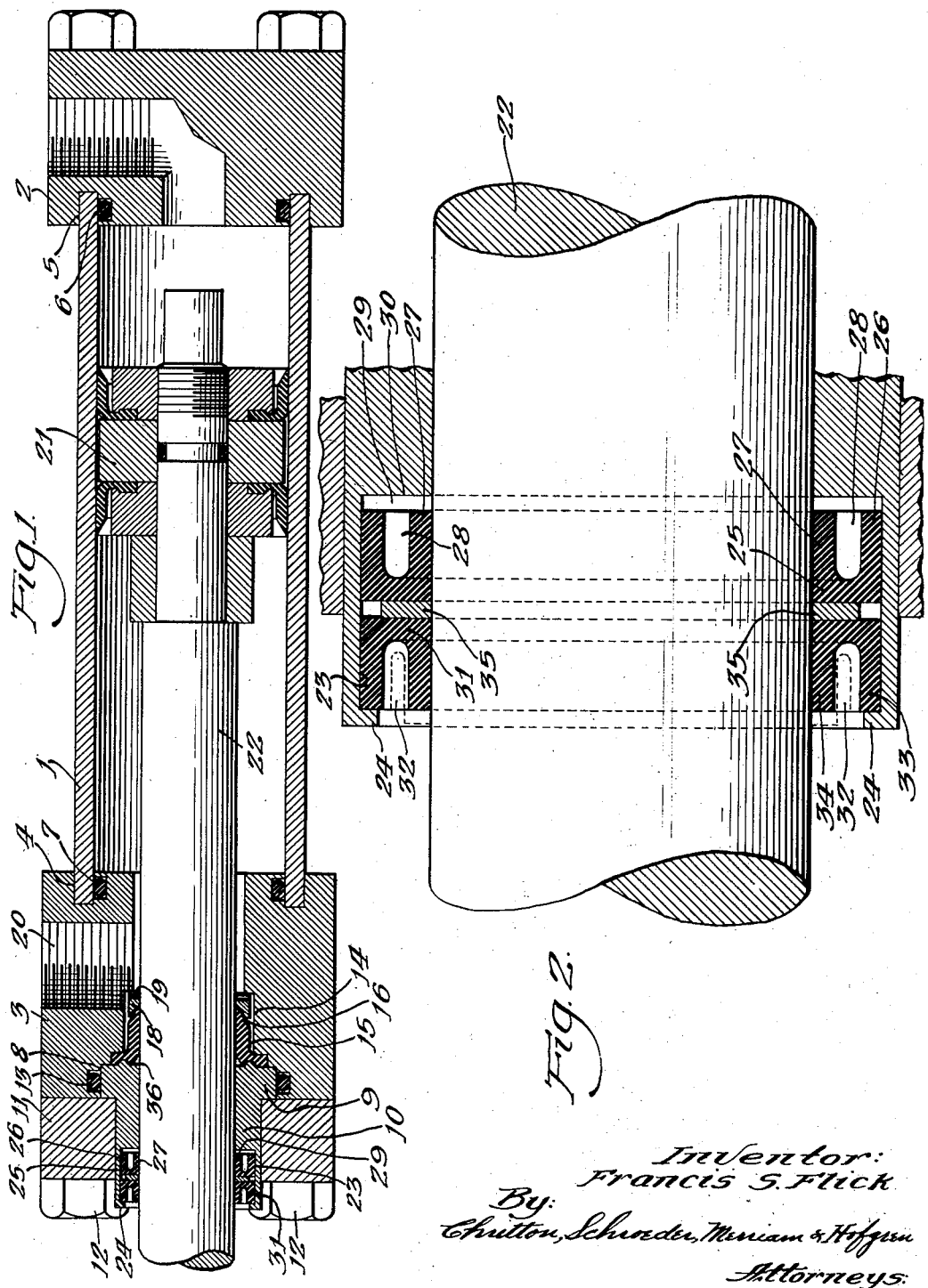
Inventor:
Francis S. Flick
By:
Chritton, Schroeder, Merriam & Hofgren
Attorneys Patented July 7, 1953

2,644,701

UNITED STATES PATENT OFFICE 2,644,701

PISTON ROD SEAL

Francis S. Flick, Chicago, Ill., assignor to Miller Motor Company, a partnership composed of William J. Reedy and Francis S. Flick Application November 10, 1948, Serial No. 59,377

8 Claims. (Cl. 286—26)

This invention relates to a piston rod seal for high or medium pressure hydraulic cylinders and more particularly to a combined hydraulic wiper and dirt wiper for working in conjunction with the high pressure seal of the copending application of myself and B. F. Bower, Serial No. 772,940, filed September 9, 1947 for "Piston Rod Seal," to provide a further seal for oil in the space in front of the pressure seal of said application, and a dirt wiper for preventing suction of air and dirt into the cylinder.

In the high pressure seal of said copending application, due to the curvature between the toe and the heel of the annular bevelled-end packing, a space is formed behind the high pressure packing, said space being occupied by oil. When high pressure is exerted against said high pressure packing it has a tendency to bend to more tightly squeeze the front inner face of the packing into said space, which in turn tends to force the oil in said space forwardly along the piston rod. In order to prevent said last mentioned oil from escaping beyond the piston rod bushing I have provided the present invention which effectively prevents leakage of such oil and at the same time prevents suction of air and dirt into the cylinder.

Among the objects of my invention are: to provide a novel and improved seal for sealing piston rods and the like in high or medium pressure hydraulic cylinders; to provide a piston seal a short distance in front of a pressure seal and having a pair of oppositely positioned channel-shaped wiper members for preventing the escape to the outside of the cylinder of oil from said pressure seal; to provide a novel construction and arrangement of hydraulic wiper and dirt wiper; to provide a pair of channel-shaped wiper members having a wiper washer positioned therebetween so that said wipers and wiper washer may have movement longitudinally upon the piston rod; to provide a movable and flexible hydraulic wiper and resilient dirt wiper for returning the hydraulic wiper to its original position when the pressure of oil behind the hydraulic wiper is relieved by a rearward movement of the piston rod; to provide a novel arrangement of piston rod bushing and a pair of channel-shaped resilient wipers arranged back to back and having limited movement longitudinally of the piston rod; to provide a novel arrangement of high or medium pressure seal and a pair of oppositely positioned channel-shaped wiper members; to provide a hydraulic wiper having a channel-shaped opening around its annular extent and a flexible side wall pressed against the piston rod when oil pressure is present in the channel, and resilient means in front of the hydraulic wiper for returning the same to rearward position when the pressure of the oil therein is relieved; to provide a novel arrangement of high or medium pressure seal and wiper members so arranged as to provide an internal drain-back for transferring oil in one of the wipers to the space in front of the pressure seal; and such further objects, advantages and capabilities, inherently possessed by my invention, as will later more fully appear.

The invention is illustrated in a preferred embodiment in the accompanying drawing, in which—

Fig. 1 is a central longitudinal section through a high pressure hydraulic cylinder embodying my invention.

Fig. 2 is an enlarged fragmentary section corresponding to the left hand portion of Fig. 1 and showing the hydraulic wiper, the dirt wiper, the wiper washer, and associated parts when the wipers are in relieved position.

In the embodiment illustrated, there is provided a high or medium pressure hydraulic cylinder 1 having a rear cylinder head 2 and a front cylinder head 3. The front cylinder head is formed with an annular recess 4 in which the front end of the cylinder is seated, and the rear cylinder head is formed with an annular recess 5 in which the rear end of the cylinder is seated. The respective ends of the cylinder 1 are further sealed with relation to the front and rear cylinder heads by O rings 6 and 7. The front cylinder head 3 is formed with an annular recess 8 within which is seated the annular flange 9 of the piston rod bushing 10, which latter is preferably formed of bronze or the like. Clamped against the outer side face of flange 9 is an annular retainer 11, these parts being held in place by nuts 12 threaded upon the adjacent ends of tie rods (not shown) which tie rods extend through the front cylinder head, and through the rear cylinder head. The front cylinder head 3 is, around the flange 9, formed with an annular groove within which is seated an O sealing ring 13.

Also formed in the front cylinder head 3 is an annular recess 14 within which is seated a high or medium pressure seal constructed in accordance with said copending application 772,940, this pressure seal comprising in general a packing 15 of leather, synthetic rubber or the like, having on its rear end a bevel 16 against which is pressed a ring 18 having a bevel somewhat greater than that of the bevel 16, this ring 18 being urged against the bevelled rear edge of packing 15 by a wave spring 19. This high or medium pressure seal is being claimed in said copending application. Oil under pressure is introduced into the cylinder through any suitable conduit means threaded in the opening 20. Longitudinally reciprocable inside of the cylinder 1 is a piston 21 fixed to the rear end portion of the piston rod 22, which piston rod is reciprocably mounted in a central opening in the front cylinder head 3, and through the pressure seal 15, the piston rod bushing 10, and the sealing means of the present invention later more fully described.

Piston rod bushing 10 is formed in its front end with an inwardly extending annular recess 23 the main wall of which at its front end is formed with an inwardly extending flange 24. Positioned in the rear end portion of recess 23 is an annular channel-shaped hydraulic wiper 25 the open side of the channel therein facing toward the cylinder (see Figs. 1 and 2). The outer side wall 26 of the channel-shaped hydraulic wiper 25 presses against the outer side of the recess 23 and the inner side wall 27 of said channel-shaped hydraulic wiper presses against the adjacent face of the piston rod 22. For convenience the space within the channel of said hydraulic wiper 25 is designated at 28. An annular space 29 is provided between the rear edge of hydraulic wiper 25 and the adjacent end wall 30 of the annular recess 23.

Positioned in the front end portion of recess 23 is an annular channel-shaped dirt wiper 31 which is similar in construction to that of hydraulic wiper 25 except to be reversely positioned. In other words the space 32 within the dirt wiper 31 faces to the front while space 28 within the hydraulic wiper faces to the rear The outer side wall 33 of the dirt wiper has its front edge abutting against the inside surface of flange 24, whereas the inner side wall 34 of the dirt wiper is free to move a slight distance forwardly when pressure is exerted thereagainst from the hydraulic wiper as shown in dotted lines in Fig. 2. Each of the hydraulic wiper and the dirt wiper are formed of synthetic rubber and are flexible and resilient in nature. Positioned between the adjacent closed faces of the hydraulic and dirt wipers is a wiper washer 35 preferably formed of bronze and of an outside diameter slightly smaller than that of the inside diameter of flange 24 so that this wiper washer may be inserted into recess 23 during assembly of these parts. While the hydraulic wiper 25 and the dirt wiper 31 may be of any suitable synthetic rubber, I preferably use Neoprene, Buna N, or other similar material.

In assembling the hydraulic wiper, the wiper washer and the dirt wiper, a small quantity of oil is first inserted into the recess 23 with the cylinder standing upright and the front cylinder head at the top, after which the hydraulic wiper 25 will be distorted and forced inwardly through the opening within the flange 24 so as to push this hydraulic wiper inwardly into contact with the oil in this recess. The wiper washer 35 is next placed upon the closed upper end of the hydraulic wiper when the parts are standing in vertical position as referred to above, after which the dirt wiper 31 will be distorted and forced into the recess 23 back of the wiper washer 35 so that the parts will then be in the position shown in Fig. 2. A slight amount of the oil in the chamber behind the hydraulic wiper will, during reciprocation of the piston rod, be forced into the space 36 in front of the pressure seal packing member 15, or if desired some oil may be introduced into said space 36 during assembly of the pressure seal parts.

This oil lubricates the piston rod 22 within the piston rod bushing 10 as the piston rod reciprocates back and forth therethrough. When the piston is forced to the right as viewed in Fig. 1 oil under pressure is admitted through the opening 20 into the cylinder which oil will at the same time be forced against the outside of the pressure seal packing 15. This will tend to collapse the forward inner surface of the packing 15 more or less into the space 36 which will force oil through the very small space between the piston rod 22 and the bore in the piston rod bushing 10 and into the space 29 behind the hydraulic wiper 25 and into the space 28 in the channel of the hydraulic wiper. These spaces in and behind the hydraulic wiper already being filled with oil as explained above during assembly, this entry of additional oil under pressure into said spaces behind and in the hydraulic wiper will force the hydraulic wiper a greater or less distance rearwardly which in turn will force the wiper washer 35 forwardly (to the left as viewed in Figs. 1 and 2) and force the dirt wiper 31 to the left. The flange 24 however holds the outer side wall 33 of the dirt wiper from being pushed out of recess 23 but the resilience of the dirt wiper will permit it to be squeezed a distance forwardly which will cause the inner side wall 34 of the dirt wiper to move more or less outwardly from the recess 23 as shown in dotted lines in Fig. 2. Fig. 2 also shows how the squeezing of the dirt wiper will somewhat lessen the space 32 in the channel thereof.

As will be understood when the hydraulic wiper 25 is forced more or less forwardly by the pressure of the oil behind the same the wiper washer 35 will have a corresponding longitudinal movement with relation to the outer wall of the recess 23 of the piston rod bushing 10. This occurs while the piston and piston rod are moving to the right as viewed in Fig. 1 and is due to the pressure of the oil causing said movement of the piston. When the piston and piston rod moves in the opposite direction oil pressure will be on the other side of the piston and the pressure will be relieved on the left hand side of the piston as viewed in Fig. 1. This relieves the pressure against the pressure seal packing 15 and allows the compressed dirt wiper due to its resiliency to resume its original shape which will force the hydraulic wiper rearwardly and cause the excess oil formerly in the space in and behind the hydraulic wiper to return in a narrow film along the piston rod into cavity 36 in front of the packing 15.

While the pressure is built up behind and in the space within the hydraulic wiper said pressure will force the inner wall 27 of the hydraulic wiper inwardly against the piston rod and thus form a perfect seal to prevent any lubricant from passing forwardly beyond the hydraulic wiper and collecting in drops outside of the cylinder. It is thus seen that the oil behind and within the hydraulic wiper and in the cavity 36 will serve as a perfect non-leaking lubricant for the piston rod within the piston rod bushing 10. This, as will be seen, serves as an internal drain-back between the space behind the hydraulic wiper and the cavity in front of the pressure seal packing 15. This is important as it eliminates passageways externally of the cylinder between these parts.

The foregoing detailed description is given for clearness of understanding only, and no unnecessary limitations should be understood therefrom, for some modifications will be obvious to those skilled in the art.

I claim:

1. In a seal adapted for sealing piston rods and the like in pressure hydraulic cylinders, comprising a cylinder head, a piston rod bushing in said head and having an annular recess formed in one end, an inwardly extending annular flange on the free end of said piston rod bushing, a channel-shaped hydraulic wiper in said recess, a channel-shaped dirt wiper in said recess with the opening in its channel directed in the opposite direction from that of the opening in the channel of the hydraulic wiper, and a wiper washer separating said two channel-shaped wipers, the channel in said dirt wiper being longitudinally open to the outside of said cylinder head.

2. A piston rod seal as claimed in claim 1, in which said channel-shaped wipers are formed of flexible material and in which said wiper washer is movable longitudinally of the piston rod to enable movement in the same direction as said channel-shaped wipers, and in which said wiper washer is of an outside diameter smaller than the inside diameter of said annular flange so that the washer may be slid into place through the opening in the annular flange.

3. A piston rod seal as claimed in claim 2, in which said dirt wiper is provided with a pair of opposite forwardly extending sides, one of said sides bearing against said flange and the other being movable beyond said flange forwardly part way out of said recess to permit forward movement of both of said channel-shaped wipers, said dirt wiper having resilience to force the hydraulic wiper and the wiper washer rearwardly when pressure on the hydraulic wiper is relieved.

4. A piston rod seal for a cylinder having a front head, a rear head and a piston rod bushing in the front head, comprising: a pressure seal and a wiper longitudinally spaced in said front head, said front cylinder head having an annular cavity therein in which is mounted the pressure seal having a restricted oil space in front of the same, a retainer for holding said piston rod bushing against said front cylinder head, said piston rod bushing having an annular recess in its forward end, an annular channel-shaped hydraulic wiper in said recess with the opening of the channel therein facing toward the cylinder, a space between the hydraulic wiper and the adjacent rear wall of said recess, and an annular channel-shaped dirt wiper having the opening of its channel facing in the opposite direction from that in the hydraulic wiper, and means for holding one side of said dirt wiper from being pushed out of said recess and permitting the other side to be pushed forwardly under stress a limited distance from said recess.

5. A piston rod seal as claimed in claim 4 in which said means comprises an inwardly extending annular flange on the free end of said piston rod bushing forming an opening of a size to directly expose the channel of the dirt wiper to the outside of the front cylinder head.

6. A piston rod seal as claimed in claim 5, in which an annular wiper washer is positioned between said hydraulic wiper and dirt wiper and is longitudinally slidable on the piston rod to permit movement of said hydraulic wiper and compression and expansion of said dirt wiper, said wipers having flat closed ends against which the sides of the washer bear.

7. A piston rod seal as claimed in claim 6, in which said pressure seal is formed with an upstanding front flange gripped between the piston rod bushing and the front cylinder head by said retainer, and in which oil in said space in front of the pressure seal is forced along the piston rod into the space behind the hydraulic wiper in one direction of movement of the piston rod, and back into the space in front of the pressure seal during movement of the piston rod in the opposite direction, thus forming an internal drain-back.

8. In a piston rod seal, a piston rod bushing having an annular open ended space around a piston rod, an integral inwardly extending annular flange at the free end of said piston rod bushing, and a pair of channel-shaped wiper members in said space, the channel in each wiper member forming an inner cavity, the channel in one of said wipers facing forwardly, and the channel in the other of said wipers facing rearwardly, said flange extending inwardly a distance to engage only the outer portion of said forwardly facing wiper, said seals having flat adjacent closed ends, a wiper washer between said closed ends for sliding movement longitudinally of said piston rod, said washer being of a size to pass between said piston rod and said inwardly extending flange, the cavity in the wiper having the rearwardly facing channel receiving oil under pressure to move this wiper forwardly, and the other wiper being resilient to resist said forward movement, the forwardly facing channel having open communication with the outside air through the opening in said annular flange.

FRANCIS S. FLICK.

References Cited in the file of this patent

UNITED STATES PATENTS

| Number | Name | Date |
|---|---|---|
| 661,683 | Ball et al. | Nov. 13, 1900 |
| 960,557 | Kemmerling | June 7, 1910 |
| 1,009,787 | Power | Nov. 28, 1911 |
| 2,368,137 | Harmon | Jan. 30, 1945 |
| 2,443,332 | Summers | June 15, 1948 |
| 2,509,436 | Isenborger | May 30, 1950 |
| 2,527,088 | Young | Oct. 24, 1950 |

OTHER REFERENCES

Hydraulic Cylinders-II, Product Engineering, May 1942, page 275. (Copy Div. 52.)